No. 877,040.

PATENTED JAN. 21, 1908.

R. BLAIR.
FERTILIZER SOWER.
APPLICATION FILED NOV. 25, 1907.

2 SHEETS—SHEET 1.

Witnesses:
A. A. Olson
F. E. Sheehy

Inventor;
Robert Blair,
by Joshua R. H. Potts
Atty.

No. 877,040. PATENTED JAN. 21, 1908.
R. BLAIR.
FERTILIZER SOWER.
APPLICATION FILED NOV. 25, 1907.

2 SHEETS—SHEET 2.

Witnesses:
A. A. Olson
F. E. Sheehy

Inventor:
Robert Blair,
Joshua R. H. Potts
Att'y.

UNITED STATES PATENT OFFICE.

ROBERT BLAIR, OF CHICAGO, ILLINOIS.

FERTILIZER-SOWER.

No. 877,040.  Specification of Letters Patent.  Patented Jan. 21, 1908.

Application filed November 25, 1907. Serial No. 403,607.

*To all whom it may concern:*

Be it known that I, ROBERT BLAIR, a citizen of the United States, residing at Chicago, county of Cook, and State of Illinois, have invented certain new and useful Improvements in Fertilizer-Sowers, of which the following is a specification.

My invention relates to fertilizer sowers and the object of my invention is to provide a fertilizer sower which shall be adapted for sowing or spreading fertilizer of any character.

A further object of my invention is to provide a device as mentioned which may be arranged to properly distribute either coarse or fine fertilizer and to distribute either broad-cast or in drills.

A further object of my invention is to provide a device as mentioned which may be arranged to distribute the fertilizer in drills at any desired distance apart.

Other objects will appear hereinafter.

With these objects in view my invention consists in a rotary drum suitably mounted and comprising solid end members connected by a plurality of longitudinal members, a screen of coarse mesh wire grating secured to said drum, a similar screen of fine mesh grating detachably secured about said drum and the first grating and means for rotating the drum.

My invention further consists in a device characterized as mentioned in combination with a sheet metal member adapted to be secured about said drum, said member being of less width than the screens.

My invention further consists in various details of construction and arrangements of parts all as will be hereinafter fully described and particularly pointed out in the claims.

Figure 1:
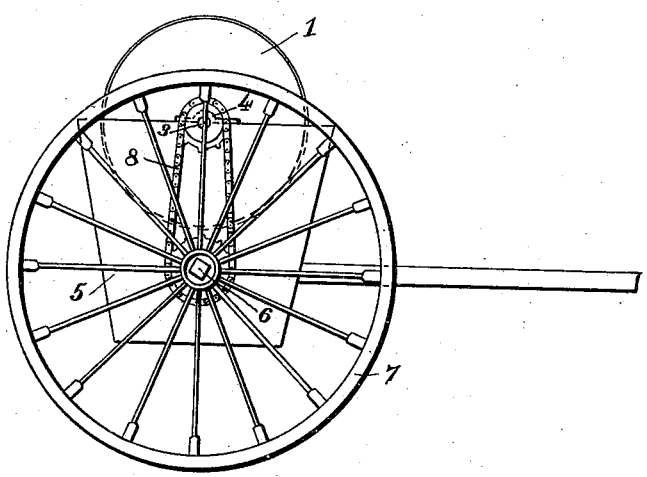
Figure 2:
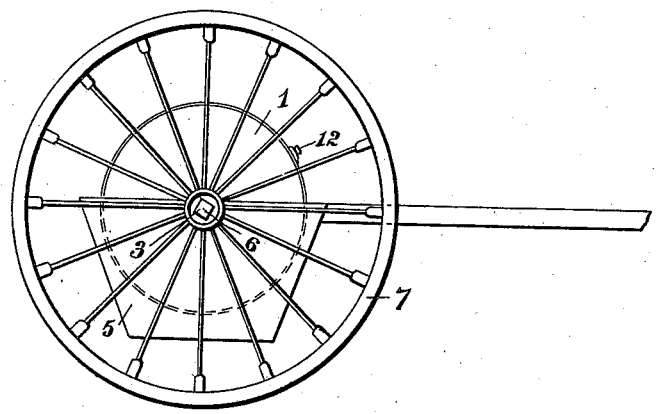
Figure 3:
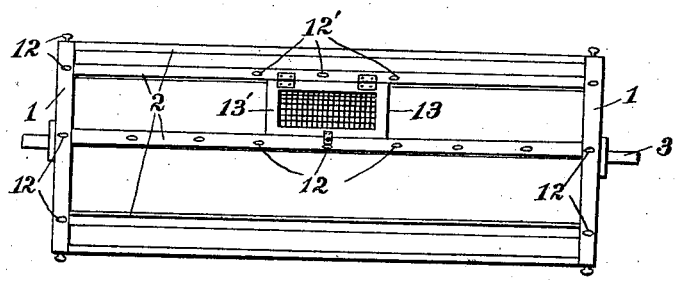
Figure 4:
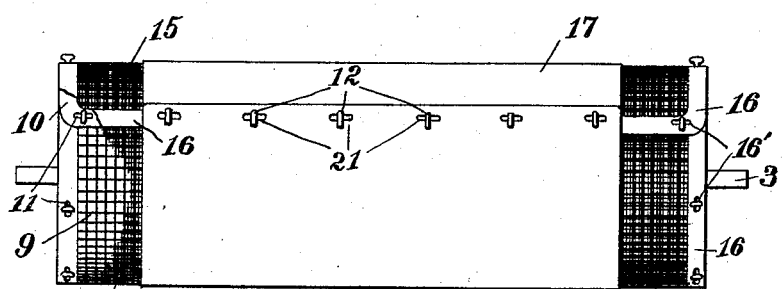
Figure 5:
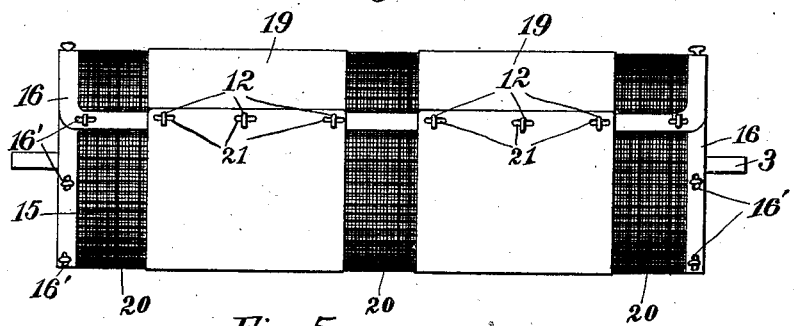
Figure 6:
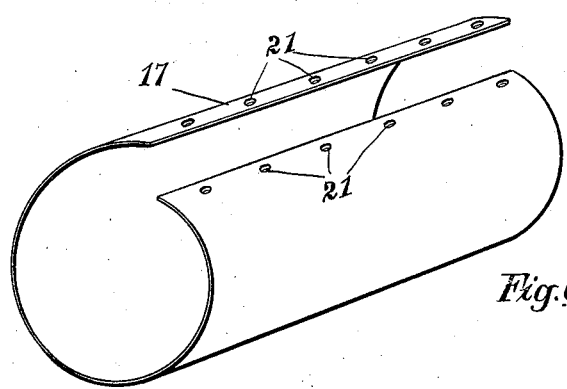
Figure 7:
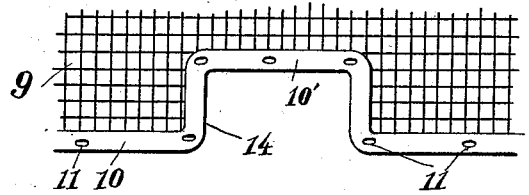

My invention will be more readily understood by reference to the accompanying drawings forming a part of this specification and in which, Figure 1 is a side elevation of a fertilizer sower embodying one form of my invention, Fig. 2 is a similar view of a modified form, Fig. 3 is an elevation of the rotary drum, Fig. 4 is an elevation of the drum equipped with the screens and a sheet metal member adapting the same for sowing the fertilizer in two drills. Fig. 5 is a similar view showing the cylinder equipped with two sheet metal members adapting the same for sowing the fertilizer in three drills, Fig. 6 is a perspective view of one of the sheet metal members detached from the drum, and Fig. 7 is a detail.

The drum comprises a pair of solid end members, 1—1 connected by a plurality of longitudinal members, 2. This portion of the device is preferably made of wood but if desired may be formed of metal without departing from my invention. The drum is mounted upon a shaft, 3. In Fig. 1 I have shown the shaft, 3 as having bearings, 4, on the top of a chute or wind-guard, 5 and above the axle, 6, of the wheels, 7 upon which the device is mounted. To rotate the drum, I connect the same by sprocket gearings, 8 to the draft wheels, 7. In Fig. 2 I have shown a modified form of the manner of mounting the drum wherein the shaft, 3 constitutes the axle of the wheels, 7 and rotates therewith. Although I have shown and described two ways of mounting the drum, I do not limit myself thereto, as the drum may be mounted in any desired way either as a simple fertilizing machine or as part of a seeder or planter, my invention residing mainly in a rotary drum suitably mounted and characterized as hereinafter described.

9 indicates a screen of coarse mesh wire grating secured about the drum. This may be permanently secured to the drum but I prefer to have it detachably fixed thereto. To this end, the screen is provided with a sheet metal edging 10 having a plurality of holes, 11 to receive the turn-buttons 12 by which it is fixed to the drum. The buttons, 12 are arranged about the peripheries of the members, 1 and across one of the members, 2. 13 indicates a door through which the drum is filled. This is arranged between two of the members, 2, being hingedly connected to one and having a catch, by which it is secured to the other. In order to avoid interfering with the door, the screen, 9 is cut in or recessed at one edge as at 14 to accommodate the door, and the strip, 2 to which the door is hinged may be provided with the buttons, 12' for securing the portion, 10' of the edging.

Detachably secured to the drum upon the outside of the screen, 9 is a similar screen, 15 formed of fine mesh wire grating and having a sheet metal edging, 16. The screen, 15 is secured to the drum by the same buttons, 12, as the screen, 9 and may be of any degree of fineness according to the nature of the fertilizer to be used. When the fertilizer is to be sown broadcast, the two screens are secured to the drum and it is obvious that the fertilizer will be sifted evenly therefrom in a track equal in width to the length of the drum. 16' are holes in the edging for the buttons, 12.

When it is desired to sow the fertilizer in drills a sheet metal member may be secured about the drum closing the same except for a narrow annular portion through which the fertilizer may be distributed. Referring to Fig. 4, 17 indicates the sheet metal member. This may be of any desired width and is secured to the drum in the same manner and by the same button as are the screens. As shown in said figure, the screen closes the central portion of the drum leaving the annular portion, 18 at the ends uncovered, hence, the fertilizer will be distributed in two drills at a distance apart equal to the width of the member, 17. It is obvious that instead of one member, 17, a plurality of similar members of less width may be employed, distributing the fertilizer in drills of less width. In Fig. 5 I have illustrated two narrow members, 19 arranged upon the drum in such a manner as to leave the annular spaces, 20 by which the fertilizer may be distributed in three drills, simultaneously. The edges of the members, 17 and 19 are provided with a plurality of holes, 21 suitably arranged to receive the buttons 12.

The door 13 comprises a frame having a panel, 13' formed of wire grating of the same sized mesh as the screen 9 and the screen, 9 covers the sides of the drum with the exception of the door portion. The screen, 15, of finer mesh grating, covers the sides of the cylinder completely, including the door.

Having described my invention what I claim as new and desire to secure by Letters Patent is:

1. In a device of the class described, a drum rotatably mounted upon a suitable support and comprising a pair of solid end members connected by a plurality of longitudinal members, in combination with a coarse mesh wire screen secured about said drum, a screen of finer mesh detachably secured about said drum and the first said screen and means for rotating said drum, substantially as described.

2. In a device of the class described, a drum rotatably mounted upon a suitable support and comprising a pair of solid end members connected by a plurality of longitudinal members, in combination with a coarse mesh wire screen detachably secured about said drum, a screen of finer mesh detachably secured about said drum and the first said screen and means for rotating said drum, substantially as described.

3. In a device of the class described, a drum rotatably mounted upon a suitable support and comprising a pair of solid end members connected by a plurality of longitudinal members and a door arranged between two of said longitudinal members, in combination with a coarse mesh wire screen covering the sides of said drum except said door and a screen of finer mesh entirely covering the sides of said drum, substantially as described.

4. In a device of the class described, a rotary drum comprising a pair of solid end members connected by a plurality of longitudinal members, in combination with a screen adapted to be arranged about said drum, said drum having a plurality of turn-buttons arranged upon one of said longitudinal members and the ends of said screen having a corresponding number of holes to receive said buttons as and for the purpose specified.

5. In a device of the class described, a rotary drum comprising a pair of solid end members connected by a plurality of longitudinal members, one of said longitudinal members being equipped with a plurality of turn-buttons in combination with a screen adapted to be wrapped about said drum and to have its end secured thereto by said buttons and a sheet metal member adapted to be wrapped about said drum and said screen and to be secured thereto by said buttons, substantially as described.

In testimony whereof I have signed my name to this specification in the presence of two subscribing witnesses.

ROBERT BLAIR.

Witnesses:
   FRANCES E. SHEEHY,
   HOWARD S. AUSTIN.